United States Patent
Jang et al.

(10) Patent No.: US 10,907,770 B2
(45) Date of Patent: Feb. 2, 2021

(54) DEVICE FOR MAINTAINING INTERNAL TEMPERATURE OF PRESSURE VESSEL

(71) Applicants: Hun Jang, Sejong (KR); Yong Kyoon Mok, Daejeon (KR); Yoon Ho Kim, Daejeon (KR); Min Young Choi, Daejeon (KR); Dae Gyun Ko, Daejeon (KR); Sung Yong Lee, Daejeon (KR); Jong Sung Yoo, Daejeon (KR)

(72) Inventors: Hun Jang, Sejong (KR); Yong Kyoon Mok, Daejeon (KR); Yoon Ho Kim, Daejeon (KR); Min Young Choi, Daejeon (KR); Dae Gyun Ko, Daejeon (KR); Sung Yong Lee, Daejeon (KR); Jong Sung Yoo, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 49 days.

(21) Appl. No.: 16/439,017

(22) Filed: Jun. 12, 2019

(65) Prior Publication Data

US 2019/0293237 A1 Sep. 26, 2019

Related U.S. Application Data

(63) Continuation of application No. PCT/KR2017/005474, filed on May 25, 2017.

(30) Foreign Application Priority Data

Dec. 12, 2016 (KR) ........................ 10-2016-0168613

(51) Int. Cl.
G21C 17/06 (2006.01)
F17C 1/12 (2006.01)
G01N 17/02 (2006.01)

(52) U.S. Cl.
CPC ............... *F17C 1/12* (2013.01); *G01N 17/02* (2013.01); *G21C 17/06* (2013.01)

(58) Field of Classification Search
CPC combination set(s) only.
See application file for complete search history.

(56) References Cited

U.S. PATENT DOCUMENTS 2,948,516 A * 8/1960 Martinelli .............. G21C 17/04
165/11.1
3,141,324 A * 7/1964 Boies ..................... G01N 33/18
73/61.62

(Continued)

FOREIGN PATENT DOCUMENTS

JP 2009-156679 A 7/2009
JP 4619398 B2 1/2011

(Continued)

*Primary Examiner* — Ljiljana V. Ciric
(74) *Attorney, Agent, or Firm* — Reinhart Boerner Van Deuren P.C.

(57) ABSTRACT

A device for maintaining the internal temperature of a pressure vessel. The device includes a pressure vessel equipped with a main heater for heating test water to a predetermined test temperature and for maintaining the predetermined test temperature, a preheater for primarily heating the test water to the predetermined test temperature before the main heater heats the test water, and a heat exchanger including an feed pipe for feeding the test water heated by the preheater to the pressure vessel and a discharge pipe for transporting the test water discharged from the pressure vessel, in which the feed pipe is disposed inside the discharge pipe.

4 Claims, 4 Drawing Sheets

(56) References Cited

U.S. PATENT DOCUMENTS

| | | | | |
|---|---|---|---|---|
| 3,147,191 A * | 9/1964 | Crowther | G21C 3/30 | 376/172 |
| 3,660,231 A * | 5/1972 | Fox | G21C 11/06 | 376/384 |
| 3,663,725 A * | 5/1972 | Pearl | F22D 11/006 | 376/306 |
| 3,670,561 A * | 6/1972 | Hundere | G01N 15/0618 | 73/61.62 |
| 3,960,496 A * | 6/1976 | Schieber | G01N 17/00 | 422/53 |
| 4,176,544 A * | 12/1979 | Eyles | G01N 33/2805 | 436/6 |
| 4,283,200 A * | 8/1981 | Bodmer | G01N 17/00 | 422/53 |
| 4,339,945 A * | 7/1982 | Knudsen | G01N 33/1893 | 73/61.62 |
| 4,426,880 A * | 1/1984 | Walters | G01N 17/008 | 73/61.62 |
| 4,628,870 A * | 12/1986 | Draper | F22B 1/165 | 122/32 |
| 4,635,589 A * | 1/1987 | Draper | F22B 1/165 | 122/356 |
| 4,640,233 A * | 2/1987 | Draper | F22B 37/56 | 122/488 |
| 4,654,187 A * | 3/1987 | Fejes | G21C 17/022 | 376/245 |
| 4,660,510 A * | 4/1987 | Draper | F22B 37/56 | 122/31.1 |
| 4,727,826 A * | 3/1988 | Draper | F22B 1/165 | 122/379 |
| 4,833,622 A * | 5/1989 | Barto | F01K 21/06 | 700/271 |
| RE33,346 E * | 9/1990 | Knudsen | G01N 25/18 | 422/53 |
| 4,978,506 A * | 12/1990 | Calderwood | G01N 17/00 | 210/263 |
| 5,101,658 A * | 4/1992 | Wilson, III | G01N 33/2805 | 374/43 |
| 5,178,822 A * | 1/1993 | Buford, III | G21C 17/017 | 376/305 |
| 5,268,103 A * | 12/1993 | Jameson | B01D 11/0203 | 210/634 |
| 5,334,291 A * | 8/1994 | Gavlin | B01D 3/02 | 122/379 |
| 5,428,653 A * | 6/1995 | El-Genk | G21C 1/07 | 376/318 |
| 5,430,779 A * | 7/1995 | Baversten | G21C 13/02 | 376/287 |
| 5,531,103 A * | 7/1996 | Eaton | G01N 17/00 | 73/61.62 |
| 5,596,613 A * | 1/1997 | Gluntz | G21C 9/008 | 376/283 |
| 6,159,427 A * | 12/2000 | Kherani | G01N 33/18 | 422/82.01 |
| 6,381,962 B1 * | 5/2002 | Ohshita | F23G 5/48 | 60/645 |
| 9,182,114 B2 * | 11/2015 | Price | F22D 1/02 | |
| 9,765,978 B2 * | 9/2017 | Billings | F22B 37/44 | |
| 2010/0281954 A1 * | 11/2010 | Oh | G01M 13/005 | 73/40.5 R |
| 2012/0192813 A1 * | 8/2012 | Evans | F23N 5/00 | 122/20 B |
| 2013/0044851 A1 * | 2/2013 | Winters | G21C 15/182 | 376/299 |
| 2019/0352194 A1 * | 11/2019 | Thiers | C02F 1/441 | |

FOREIGN PATENT DOCUMENTS

| | | |
|---|---|---|
| JP | 2014-163780 A | 9/2014 |
| KR | 10-1103978 B1 | 1/2012 |
| KR | 10-1143220 B1 | 5/2012 |

* cited by examiner

DEVICE FOR MAINTAINING INTERNAL TEMPERATURE OF PRESSURE VESSEL

CROSS-REFERENCE TO RELATED PATENT APPLICATIONS

This patent application is a continuation of PCT/KR2017/005474, filed May 25, 2017, which claims priority to Korean Patent Application No. 10-2016-0168613, filed Dec. 12, 2016, the entire teachings and disclosure of which are incorporated herein by reference thereto.

TECHNICAL FIELD

The present invention relates to a temperature maintaining device for a pressure vessel. More particularly, the present invention relates to a device for maintaining the internal temperature of a pressure vessel by controlling the temperature of test water that passes through the pressure vessel.

BACKGROUND

Typically, nuclear power plants produce electricity using fission energy generated from a nuclear fuel in a reactor. Most nuclear power plants in Korea use a pressurized water reactor (PWR). This nuclear reactor, PWR, transfers fission energy (i.e., the energy released by the fission of atoms) to a turbine by using light water. Most of the parts constituting a reactor are exposed to high-pressure hot water. Therefore, deterioration of the integrity of equipment frequently occurs due to various degradation mechanisms such as corrosion, stress corrosion cracking, and corrosion fatigue. In particular, reduction in thickness of nuclear fuel claddings in a high-pressure hot water environment inside a nuclear reactor is one of the most important factors affecting the design of a reactor.

The current operating conditions of nuclear power plants require a nuclear fuel for high burnup which can extend a fuel cycle to reduce the cycle cost of a nuclear fuel as a part of improving the economic feasibility. Therefore, much effort is being made to improve the corrosion damage resistance of the nuclear fuel cladding. In order to increase the corrosion resistance of zirconium alloys used as the material of nuclear fuel cladding, various efforts such as development of new alloys and control of water chemistry factors have been made.

The corrosion characteristics of zirconium alloys used as the material of the nuclear fuel cladding needs to be evaluated in a situation simulating the environment of the primary side of a nuclear power plant, which is the environment in which the nuclear fuel cladding is exposed to water. In order to simulate the environment of the primary side of a nuclear power plant, an environmental simulator composed of various complicated devices such as devices for maintaining a high-pressure hot water environment and devices for controlling water chemistry factors is needed. For example, a pressure vessel is required to test for corrosion of zirconium alloys in a high-pressure hot water environment. These devices are complicated in structure. Thus, high costs for manufacturing, operation, and maintenance of expensive test equipment are incurred. In addition, the corrosion test of zirconium alloys takes a very long test time. Therefore, to improve test efficiency, it is desirable to put as many specimens as possible into a single pressure vessel. This reduces the number of pieces of test equipment and shortens a total test time, thereby improving test efficiency.

As to a pressure vessel to accommodate specimens for corrosion test of a zirconium alloy that is a typical cladding material, it is increasingly difficult to maintain the interior of the pressure vessel at a constant temperature as the size of the pressure vessel is increased. In most cases, the upper part of a pressure vessel is maintained at a relatively high temperature and the lower part is maintained at a relatively low temperature. As the size of a pressure vessel increases, the temperature difference between the upper and lower parts becomes larger. To increase test efficiency by loading as many specimens as possible in a pressure vessel, it is necessary to attach specimens to the entire area of the pressure vessel. However, in that case, accurate experimental data cannot be obtained due to the temperature difference inside the pressure vessel.

Therefore, a current approach to obtain accurate experimental data from a corrosion test is to increase the number of pressure vessels used for a corrosion test. However, this method has disadvantages: high equipment costs for manufacturing or purchasing pressure vessels; and high accessory costs for purchasing high-pressure pumps and heaters required to create a similar environment to the actual operation environment of a reactor.

Document of Related Art

Korean Patent No. 10-1143220 (published as of May 18, 2012)

The present invention has been made in view of the above problems, and it is an object of the present invention to provide a device for maintaining the internal temperature of a pressure vessel at a constant level so that a plurality of specimens can be mounted in the pressure vessel.

BRIEF SUMMARY

To achieve the object of the invention, according to one aspect of the present invention, there is provided a device for maintaining the internal pressure of a pressure vessel at a constant level, the device including: the pressure vessel equipped with a main heater for heating test water to a predetermined test temperature and maintaining the predetermined test temperature; a preheater for primarily heating the test water to the predetermined test temperature before the main heater heats the test water; and a heat exchanger including a feed pipe for feeding the test water heated by the preheater to the pressure vessel and a discharge pipe for transporting the test water discharged from the pressure vessel, wherein the feed pipe is disposed inside the discharge pipe.

Preferably, the feed pipe may be inserted into the pressure vessel from the bottom side and extend up to an upper portion of the pressure vessel.

Preferably, the pressure vessel may include a specimen holding rack for holding a plurality of specimens.

Preferably, the specimen holding rack has a plurality of hooks.

The device for holding the internal temperature of a pressure vessel at a constant level, according to the present invention, can maintain the temperature of the test water contained in the pressure vessel. Therefore, even when many specimens are loaded into a pressure vessel, accurate experimental data can be obtained, a test time can be shortened, and the test costs can be reduced.

DETAILED DESCRIPTION

In the following description, the specific structural or functional descriptions for exemplary embodiments according to the concept of the present disclosure are merely for illustrative purposes and those skilled in the art will appreciate that various modifications and changes to the exemplary embodiments are possible, without departing from the scope and spirit of the present invention. Therefore, the present invention is intended to cover not only the exemplary embodiments but also various alternatives, modifications, equivalents, and other embodiments that may be included within the spirit and scope of the embodiments as defined by the appended claims.

Hereinbelow, exemplary embodiments of the present disclosure will be described in detail with reference to the accompanying drawings.

Figure 1:
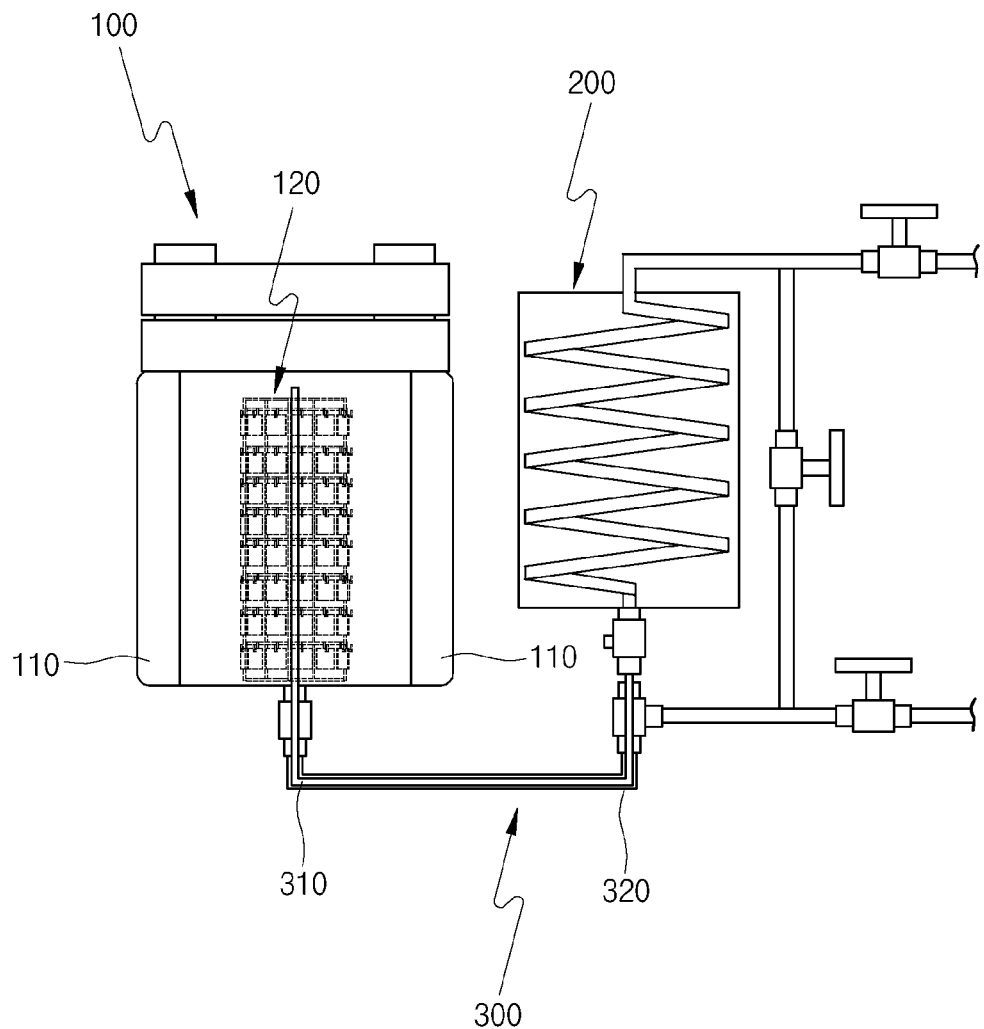
FIG. 1 is a cross-sectional view illustrating a device for maintaining the internal temperature of a pressure vessel at a constant level, according to one embodiment of the present invention.

FIG. 1 is a cross-sectional view illustrating a device for maintaining the internal temperature of a pressure vessel at a constant level. The device includes: a pressure vessel 100 equipped with a main heater 110 for heating test water to a predetermined test temperature so that the test water can be maintained at the predetermined test temperature; a preheater 200 for heating the test water to the predetermined test temperature before the main heater 110 heats the test water; and a heat exchanger 300 including a feed pipe 310 for feeding the test water heated by the preheater 200 to the pressure vessel 100 and a discharge pipe 320 for transporting the test water discharged from the pressure vessel 100, in which the feed pipe 310 is disposed inside the discharge pipe 320.

The preheater 200 has a pipe through which the test water flows. The preheater 200 heats the pipe while the test water flows along the pipe, thereby primarily increasing the temperature of the test water. The pipe is formed in a zigzag shape so that the test water can be heated to the predetermined test temperature while the test water flows along the pipe provided inside the preheater.

The pressure vessel 100 is equipped with the main heater 110 for complementing for the heat loss that is incurred until the test water heated by the preheater 200 reaches the pressure vessel 100. That is, the main heater 110 raises the temperature of the test water to the predetermined test temperature again.

The inside of the pressure vessel 100 is provided with a cylindrical specimen holding rack 120 by which a plurality of specimens can be held. The specimen holding rack 120 has a plurality of rings or hooks 121 for holding respective specimens 10.

The heat exchanger 300 includes the feed pipe 310 for feeding the test water that is heated primarily by the preheater 200 to the pressure vessel 100 and the discharge pipe 320 through which the used test water is discharged from the pressure vessel 100. The feed pipe 310 is disposed inside the discharge pipe 320.

Figure 2:
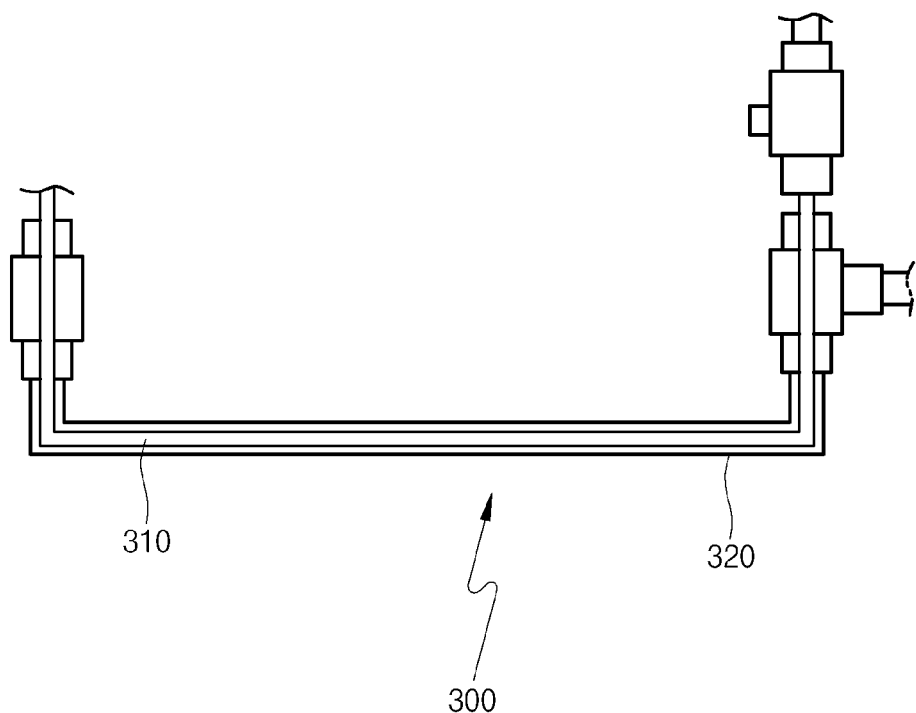
FIG. 2 is an enlarged view illustrating a heat exchanger of the temperature maintaining device according to the embodiment of the present invention.

FIG. 2 is an enlarged view of the heat exchanger of the pressure holding device according to the embodiment of the present invention. In the heat exchanger 300, the feed pipe 310 is installed to extend through the discharge pipe 320. Therefore, until the primarily heated test water reaches to the pressure vessel by flowing through the feed pipe 310, the discharge pipe 320 filled with the test water discharged from the pressure vessel prevents the heat loss of the test water that is fed to the pressure vessel through the feed pipe 310.

The feed pipe 310 is inserted into the pressure vessel 100 from the bottom side and is installed to extend up to an upper portion of the pressure vessel 100. This piping design of the feed pipe 310 is to prevent a phenomenon in which the upper part of the pressure vessel is higher in temperature than the lower part due to the density difference of the test water attributable to the temperature difference. That is, this piping design enables the test water passing through the feed pipe 310 to be first supplied to the upper part of the pressure vessel 100, which suppress the temperature rising in the upper part and reducing the temperature difference between the upper part and the lower part of the pressure vessel 100.

This piping design is also advantageous in terms that even though there is a chance that the test water transported through the feed pipe 310 experiences heat loss before reaching the pressure vessel 100, the test water can be further heated while moving from the bottom side to the top side of the pressure vessel through the feed pipe 310. Therefore, it is possible to ensure the reliable control of the test temperature of the test water.

The discharge pipe 320 is connected to the bottom side of the pressure vessel 100 while concentrically surrounding the feed pipe 310. Thus, the test water having a relatively low temperature as a result of circulating through the inside of the pressure vessel 100 is discharged through the discharge pipe 320. This facilitates circulation of the test water in the pressure vessel 100.

Figure 3:
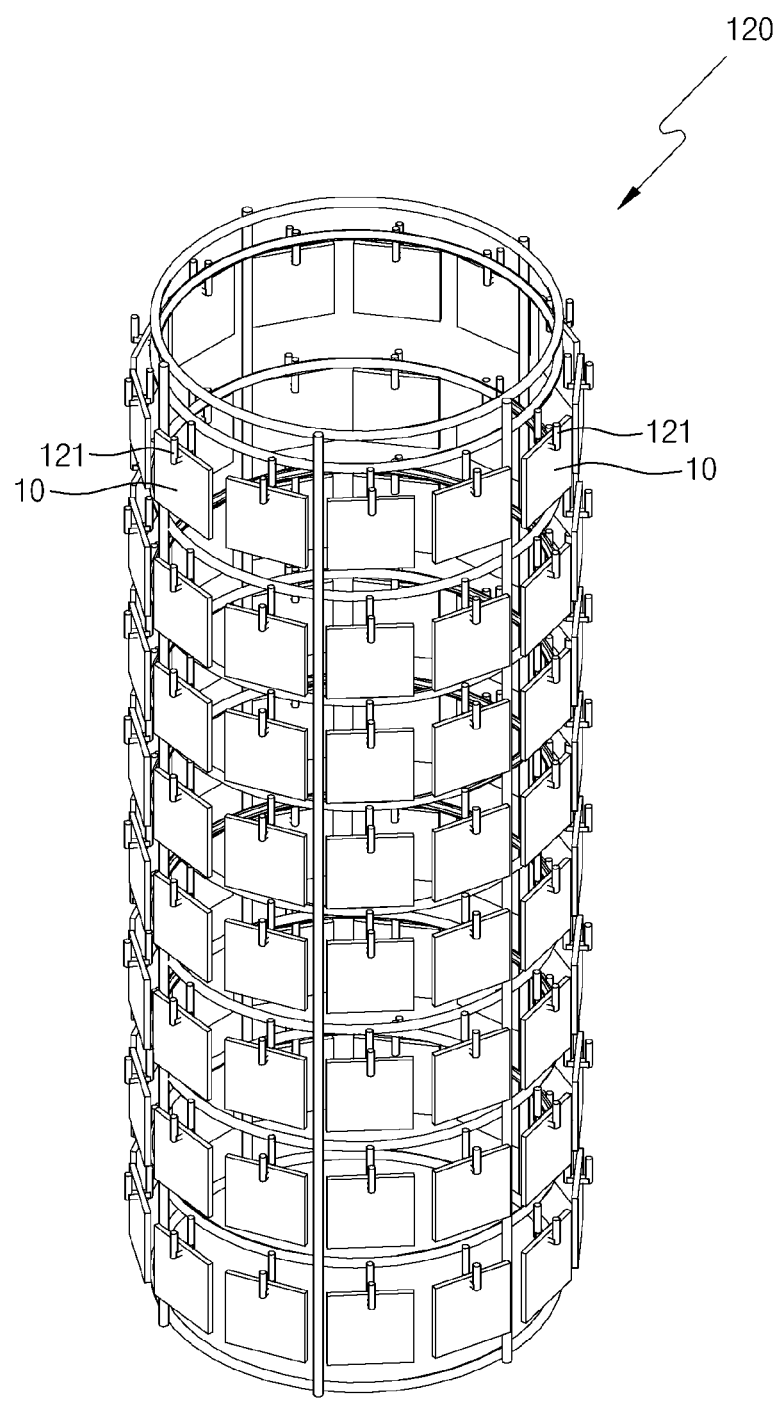
FIG. 3 is a perspective view illustrating a specimen rack of the temperature maintaining device according to the embodiment of the present invention.

FIG. 3 is a perspective view of the specimen holding rack installed in the pressure vessel. The specimen holding rack 120 is a columnar frame composed of multiple circular frames that are arranged in a vertical direction at a predetermined interval.

Each of the circular frames has a plurality of hooks 121 used to hang the specimens 10. Therefore, it is easy to mount the specimens 10. In addition, since the circular frames are spaced apart from each other by a predetermined distance in the vertical direction, it is possible to prevent the specimens 10 from colliding or overlapping with each other when mounted to the specimen holding rack.

Figure 4:
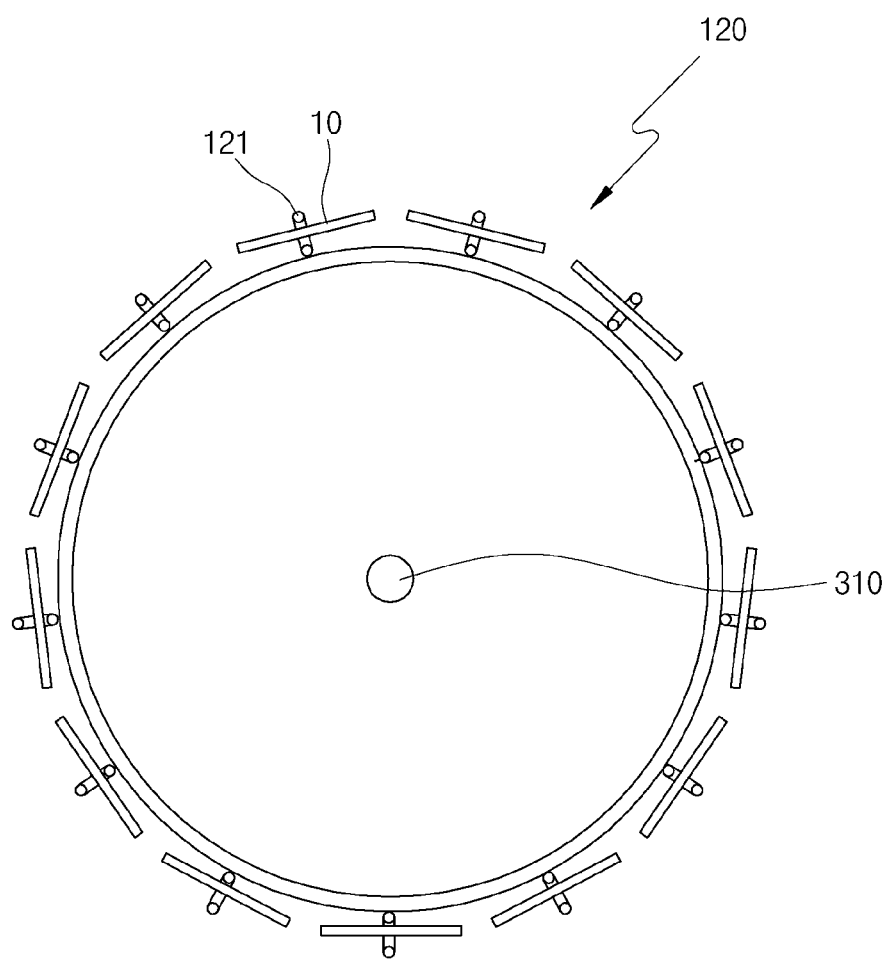
FIG. 4 is a plan view illustrating the temperature maintaining device according to the embodiment of the present invention.

FIG. 4 is a plan view of the specimen holding rack to be installed in a pressure vessel. The discharge pipe 320 is positioned at the center of the specimen holding rack 120.

By controlling the temperature of the test water discharged from the pressure vessel 100 through the discharge pipe 320, the internal temperature of the pressure vessel 100 can be maintained at a predetermined constant level, and accurate test data can be obtained from the plurality of specimens 10.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

| [Explanation of Reference Numerals] | |
|---|---|
| 10: Specimen | 100: Pressure vessel |
| 110: Main heater | 120: Specimen rack |
| 121: Ring | 200: Preheater |
| 300: Heat exchanger | 310: Feed pipe |
| 320: Discharge pipe | |

The invention claimed is:

1. A device for maintaining an internal temperature of a pressure vessel, the device comprising:
    the pressure vessel equipped with a main heater for heating test water to a predetermined test temperature and for maintaining the predetermined test temperature;
    a preheater for primarily heating the test water to the predetermined test temperature before the main heater heats the test water; and
    a heat exchanger including a feed pipe for feeding the test water heated by the preheater to the pressure vessel and a discharge pipe for transporting the test water discharged from the pressure vessel, wherein the feed pipe is disposed inside the discharge pipe.

2. The device according to claim 1, wherein the feed pipe is inserted into the pressure vessel from the bottom side and extends up to an upper portion of the pressure vessel.

3. The device according to claim 1, wherein the pressure vessel further includes a specimen holding rack for holding a plurality of specimens.

4. The device according to claim 3, wherein the specimen holding rack has a plurality of hooks.

\* \* \* \* \*